US012090456B2

(12) United States Patent
Kim et al.

(10) Patent No.: US 12,090,456 B2
(45) Date of Patent: Sep. 17, 2024

(54) MAGNETIC MIXER AND MIXING SYSTEM INCLUDING THE SAME

(71) Applicant: SEDNA ENG CO., LTD., Siheung-si (KR)

(72) Inventors: Hyuck Bae Kim, Siheung-si (KR); Jong In Kim, Siheung-si (KR)

(73) Assignee: SEDNA ENG CO., LTD., Siheung-si (KR)

( * ) Notice: Subject to any disclaimer, the term of this patent is extended or adjusted under 35 U.S.C. 154(b) by 257 days.

(21) Appl. No.: 17/467,283

(22) Filed: Sep. 6, 2021

(65) Prior Publication Data

US 2022/0219128 A1 Jul. 14, 2022

(30) Foreign Application Priority Data

Jan. 12, 2021 (KR) ........................ 10-2021-0004226

(51) Int. Cl.

| | |
|---|---|
| ***B01F 33/453*** | (2022.01) |
| ***B01F 27/80*** | (2022.01) |
| ***B01F 35/51*** | (2022.01) |
| *B01F 35/30* | (2022.01) |

(52) U.S. Cl.

CPC .......... *B01F 33/4532* (2022.01); *B01F 27/80* (2022.01); *B01F 35/51* (2022.01); *B01F 2035/352* (2022.01)

(58) Field of Classification Search

CPC .... B01F 33/45; B01F 33/453; B01F 33/4532; B01F 2035/352; B01F 35/145

See application file for complete search history.

(56) References Cited

U.S. PATENT DOCUMENTS

| | | | | |
|---|---|---|---|---|
| 2,471,015 A * | 5/1949 | Watten | .................. | B01F 33/862 384/452 |
| 5,568,985 A * | 10/1996 | Schutte | .................. | F16C 33/76 384/478 |
| 6,467,944 B2 * | 10/2002 | Ugolini | .................. | A23G 9/045 366/144 |
| 10,763,711 B2 * | 9/2020 | Han | .................. | H02K 1/28 |
| 2004/0076076 A1 | 4/2004 | Hoobyar et al. | | |

(Continued)

FOREIGN PATENT DOCUMENTS

| | | |
|---|---|---|
| CN | 201157765 Y | * 12/2008 |
| CN | 201419084 Y | * 3/2010 |

(Continued)

OTHER PUBLICATIONS

English translation of CN 111704988A, Gu, L., obtained on Jul. 21, 2023 from <https://worldwide.espacenet.com/>. (Year: 2023).*

(Continued)

*Primary Examiner* — Marc C Howell
*Assistant Examiner* — Patrick M McCarty
(74) *Attorney, Agent, or Firm* — Park, Kim & Suh, LLC

(57) ABSTRACT

The present invention relates to a magnetic mixer capable of minimizing mixing of foreign substances, which are generated in components of the magnetic mixer, of a liquid to be mixed, having a simple structure for cleansing a structure supporting an impeller shaft, and capable of securing a sufficient output when a large-scale mixing system with an impeller shaft is configured; and a mixing system including the same.

12 Claims, 9 Drawing Sheets

(56) References Cited

U.S. PATENT DOCUMENTS

| | | | | |
|---|---|---|---|---|
| 2006/0221765 | A1* | 10/2006 | Andersson .............. | F16C 17/02 366/273 |
| 2019/0184352 | A1* | 6/2019 | Trummer ................ | B01F 27/88 |
| 2021/0178347 | A1* | 6/2021 | Bishop .................. | B01F 27/192 |

FOREIGN PATENT DOCUMENTS

| | | | | |
|---|---|---|---|---|
| CN | 111704988 | A | 9/2020 | |
| EP | 2611012 | A2 * | 7/2013 | .......... B01F 13/0872 |
| GB | 1246787 | A * | 9/1971 | .............. B01F 7/166 |
| JP | 2002-272033 | A | 9/2002 | |
| KR | 101157936 | B1 * | 6/2012 | |
| KR | 200488254 | Y1 * | 1/2019 | |
| KR | 10-2019-0033596 | A | 3/2019 | |
| KR | 10-2122154 | B1 | 6/2020 | |

OTHER PUBLICATIONS

Campbell, F.C.. (2008). Elements of Metallurgy and Engineering Alloys. ASM International. Retrieved from https://app.knovel.com/hotlink/toc/id:kpEMEA000U/elements-metallurgy-engineering/elements-metallurgy-engineering (Year: 2008).*

Whites, Keith, W. (2005). Magnetostatics. Chen, Wai-Kai. (Ed.). Electrical Engineering Handbook. pp. 479-497. Elsevier. (Year: 2005).*

* cited by examiner

MAGNETIC MIXER AND MIXING SYSTEM INCLUDING THE SAME

CROSS-REFERENCE TO RELATED APPLICATIONS

A claim for priority under 35 U.S.C § 119 is made to Korean Patent Application No. 10-2021-0004226 filed on Jan. 12, 2021, in the Korean Intellectual Property Office, the entire contents of which are hereby incorporated by reference.

FIELD OF THE INVENTION

The present invention relates to a magnetic mixer and a liquid mixing system. More particularly, the present invention relates to a magnetic mixer capable of minimizing mixing of foreign substances, which are generated in components of the magnetic mixer, in a liquid to be mixed, having a simple structure for cleansing a structure supporting an impeller shaft, and capable of securing a sufficient output when a large-scale mixing system with an impeller shaft is configured; and a mixing system including the same.

BACKGROUND ART

Mixing systems are systems for mixing liquid and liquid, liquid and solid, particulate materials, etc. Such mixing systems have been widely used in a wide range of industries. In the fields of pharmaceutical, bio, food, cosmetics and fine chemical industries, there is a great demand for a mixer which is capable of preventing generation and permeation of foreign substances and can be managed sanitarily.

Mixing systems may be classified according to whether an actuator mounted on a mixing tank includes an impeller shaft for driving an impeller. In the case of a small mixing system, a permanent magnet may be embedded in an impeller and a magnetic rotor connected to a driving motor is placed inside the impeller. Thus, in a mixing system equipped with a magnetic mixer having no impeller shaft, driving force loss is small and sufficient RPM can be secured, but it is not easy to perform mixing uniformly in a mixing tank. Therefore, a large mixing system cannot be built.

Therefore, generally, a structure in which a driving motor is disposed outside a mixing tank and an impeller shaft equipped with a plurality of impellers is installed inside the mixing tank may be mainly used to configure a large-scale mixing system.

In particular, in a mixing system for mixing a pharmaceutical, bio, or fine chemical product among large-scale mixing systems, foreign substances outside a mixing tank should not be mixed with a liquid to be mixed and thus a mixer employing a sealing technique for blocking the inside and outside of the mixing tank by using a mechanical seal is used.

The mechanical seal has various hygienic or maintenance problems, such as generation of foreign substances due to deterioration of materials adsorbed or fixed in the vicinity of the mechanical seal during mixing or due to damage of the mechanical seal, low durability of the mechanical seal, etc.

In order to prevent this problem, a magnetic mixing technology has been introduced, whereby a driving force is transmitted through magnetic coupling between magnetic units even in a large-scale mixing system to which an impeller shaft is applied.

A magnetic mixer including an impeller shaft for configuring a large mixing system includes a structure supporting the impeller shaft in a mixing tank, and thus, a structure for minimizing generation of foreign substances in the structure supporting the impeller shaft, a simple cleaning structure for cleaning generated foreign substances, and securing a sufficient output with the magnetic mixer are outstanding issues.

SUMMARY OF THE INVENTION

The present invention is directed to providing a magnetic mixer capable of minimizing mixing of foreign substances, which are generated in components of the magnetic mixer, in a liquid to be mixed, having a simple structure for cleansing a structure supporting an impeller shaft, and capable of securing a sufficient output when a large mixing system with an impeller shaft is configured; and a mixing system including the same.

In accordance with one aspect of the present invention, the above and other objects can be accomplished by the provision of a magnetic mixer mounted on a mixing tank containing liquids to be mixed, the magnetic mixer comprising: a driving motor mounted outside the mixing tank; a drive shaft driven by the driving motor; a first magnetic unit provided at an end of the drive shaft and including a plurality of magnetic bodies; a top plate including a tank mounting part mounted in the mixing tank through a mounting hole of the mixing tank, a first magnetic unit receiving part configured to allow the first magnetic unit to be rotatably accommodated therein; and a support shaft extending below the first magnetic unit receiving part; a driving member mounted inside the mixing tank to be rotatable about an outside side of the top plate, the driving member including a second magnetic unit provided at the same height as the first magnetic unit; and an impeller shaft connected to the bottom of the driving member, and including at least one impeller.

And the driving member may comprise a second magnetic unit embedding part in which the second magnetic unit is embedded; a shaft through part which is connected to the bottom of the second magnetic unit embedding part and through which the support shaft of the top plate passes; and an impeller shaft connection part which is provided below the shaft through part and to which the impeller shaft is connected.

And bearing mounting holes each having an expanded inner diameter may be provided at a top and bottom of the shaft through part of the driving member to mount a bearing, wherein the shaft through part of the driving member and the support shaft of the top plate may be supported by the bearing mounted in the bearing mounting holes to be rotatable relative to each other.

And in a state in which the bearing may be mounted in the bearing mounting hole in the bottom of the shaft through part, a bearing bolt configured to support the driving member downward may be fastened to the support shaft of the top plate so as to prevent separation of the bearing.

And the bearing bolt may comprise a flange configured to support the bearing and block foreign substances from falling between a shaft through part of a body of the impeller and the support shaft of the top plate.

And a foreign substance collection groove may be formed in an upper surface of the flange of the bearing bolt.

And the shaft connection part of the driving member and an upper end of the impeller shaft may be provided in the form of a flange and fastened together by a fastening member.

And the driving member may comprise a washing water inlet through which washing water is introduced.

And the first magnetic unit or the second magnetic unit may comprise a pipe-shaped body having at a center a shaft hole in which the drive shaft is mounted or an opening in which the first magnetic unit receiving part of the top plate is disposed; and a plurality of permanent magnets with different polarities arranged alternately at certain intervals on an outer circumferential surface or inner circumferential surface of the pipe-shaped body.

And the pipe-shaped body may be formed of a supermalloy or a mu-metal material.

And the pipe-shaped body may be formed of an alloy material containing by weight 70% or more of nickel.

And the plurality of permanent magnets of the first or second magnetic unit may be spaced apart from each other, and at least some of the plurality of permanent magnets may be embedded in the pipe-shaped body.

And the pipe-shaped body may be configured by stacking ring-shaped plates each including a plurality of grooves.

And a plurality of impellers may be provided at intervals on the impeller shaft.

And the magnetic mixer may further comprise a reducer configured to connect the driving motor and the drive shaft, and a motor shaft of the driving motor may be connected to the reducer in a horizontal direction.

In accordance with one aspect of the present invention, the above and other objects can be accomplished by the provision of a mixing system: a mixing system comprising the magnetic mixer of the present invention; and a mixing tank containing liquids or particulate materials to be mixed, wherein the mixing tank comprises: a mounting hole configured to mount therein the tank mounting part of the top plate of the magnetic mixer; a pipe connection hole to which a washing water pipe for supply of washing water is to be connected; and a spray ball with a plurality of injection holes for spraying washing water into the mixing tank.

And the spray ball may be provided at a height corresponding to a driving member of the magnetic mixer.

DETAILED DESCRIPTION

Hereinafter, exemplary embodiments of the present invention will be described in detail with reference to the accompanying drawings. The present invention is, however, not limited thereto and may be embodied in many different forms. Rather, the embodiments set forth herein are provided so that this disclosure will be thorough and complete, and fully convey the scope of the invention to those of ordinary skill in the art. Throughout the specification, the same reference numbers represent the same elements.

Figure 1:
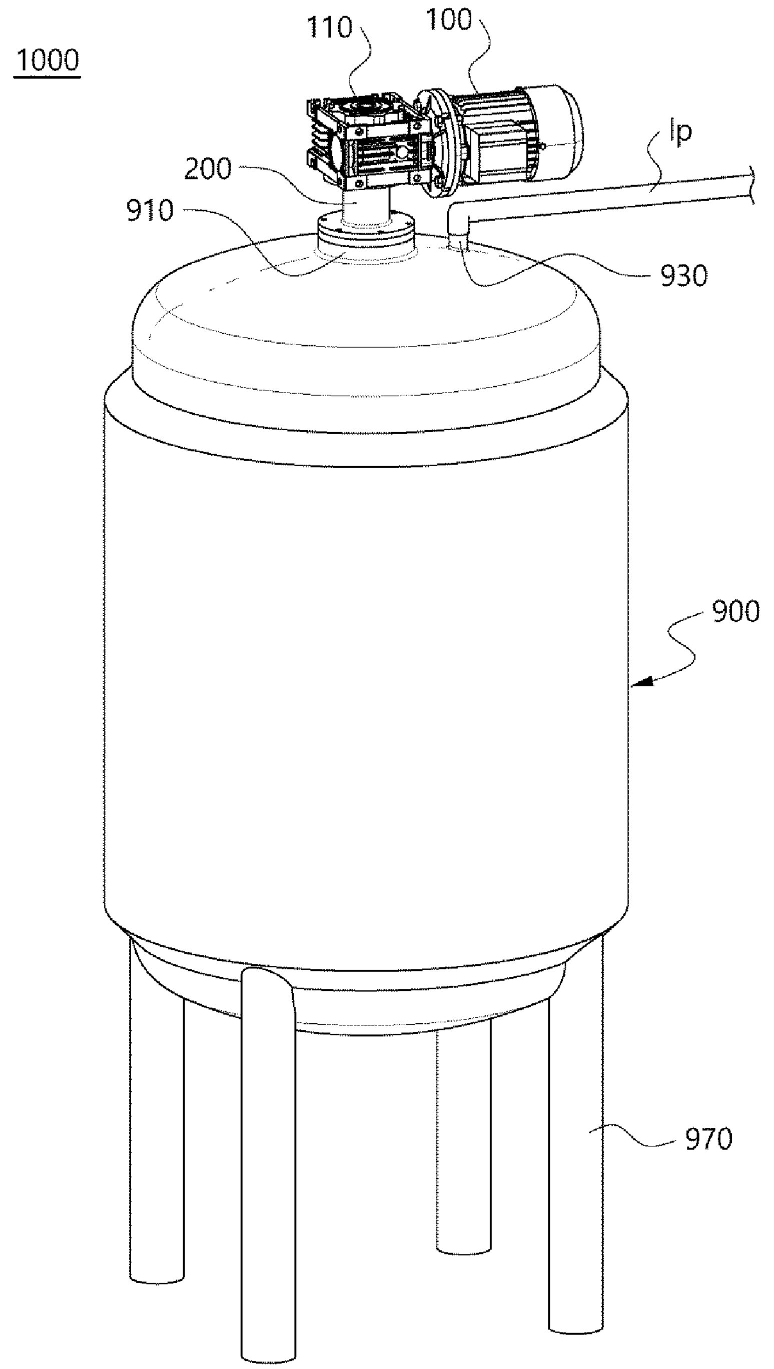
FIG. 1 is a perspective view of a liquid mixing system according to the present invention.
Figure 2:
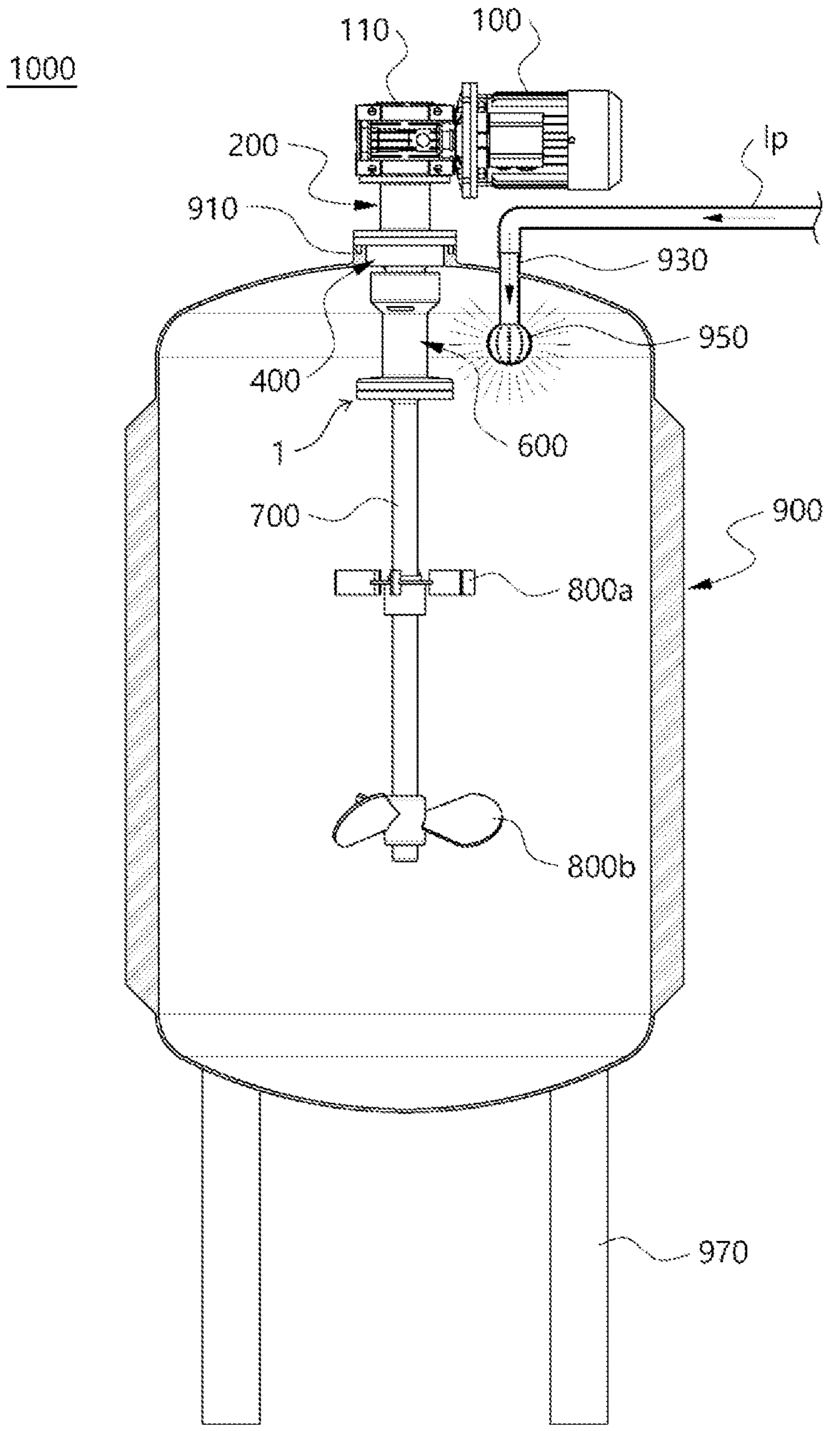
FIG. 2 is a front perspective view of the liquid mixing system of FIG. 1.

FIG. 1 is a perspective view of a liquid mixing system 1000 according to the present invention. FIG. 2 is a front perspective view of the liquid mixing system 1000 of FIG. 1.

The present invention relates to a liquid mixing system 1000 for mixing liquids in the fields of pharmaceutical, bio, food, cosmetics and fine chemical industries, and more particularly, to a magnetic mixer for minimizing generation of foreign substances in a mixing tank 900 and maximizing an output of the magnetic mixer; and the liquid mixing system 1000 including the same.

As illustrated in FIG. 1, the present invention may include a mixing tank 900, a magnetic mixer 1, which is mounted on the mixing tank 900 and will be described below, and a washing water pipe Ip installed inside the magnetic mixer 1 and configured to supply washing water to at least one spray ball 950 including a plurality of injection holes for spraying washing water.

The mixing tank 900 may include a plurality of support racks 970 and be configured in a cylindrical chamber shape.

A mounting hole 910 in which the magnetic mixer 1 is mounted and a pipe connection part 930 to which the washing water pipe Ip is to be connected may be provided on an upper surface of the mixing tank 900, and the pipe connection part 930 may be connected to the spray ball 950.

The spray ball 950 may be provided in a spherical shape or in the form of a ball with a plurality of injection holes for spraying washing water in all directions, and configured to clean the magnetic mixer 1 and an inner circumferential surface of the mixing tank 900 with washing water supplied from the washing water pipe Ip after a mixing process is completed, thereby simplifying a cleaning structure.

As shown in FIG. 2, the spray ball 950 may be provided at a height corresponding to a driving member 600 of the magnetic mixer 1. As described later, the driving member 600 is a structure in which a support shaft 450 of a top plate 400 and a bearing b are provided and thus foreign substances may be generated or accumulated due to continuous friction and thus may be arranged at a height at which washing water sprayed from the spray ball 950 may be easily supplied to the driving member 600. A method of washing the inside of the driving member 600 through washing water will be described again below.

Figure 3A:
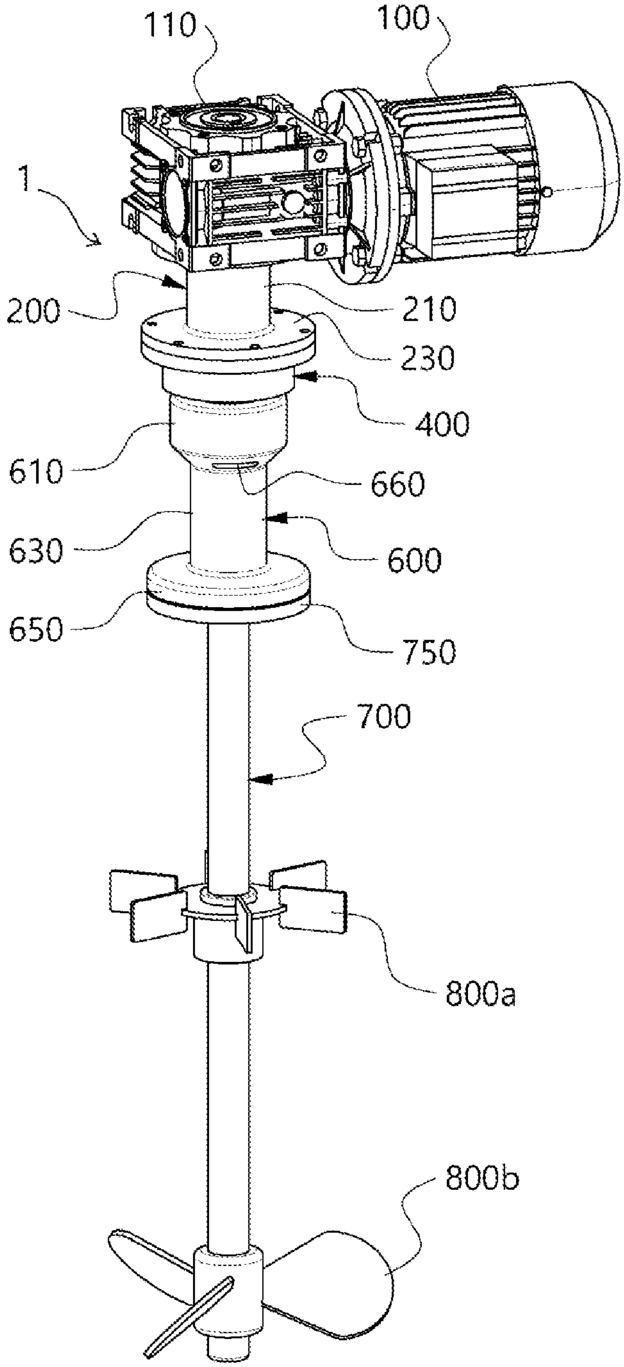
FIGS. 3A and 3B illustrate a perspective view and a side view of a magnetic mixer mounted on the liquid mixing system of FIGS. 1 and 2, according to the invention.
Figure 3B:
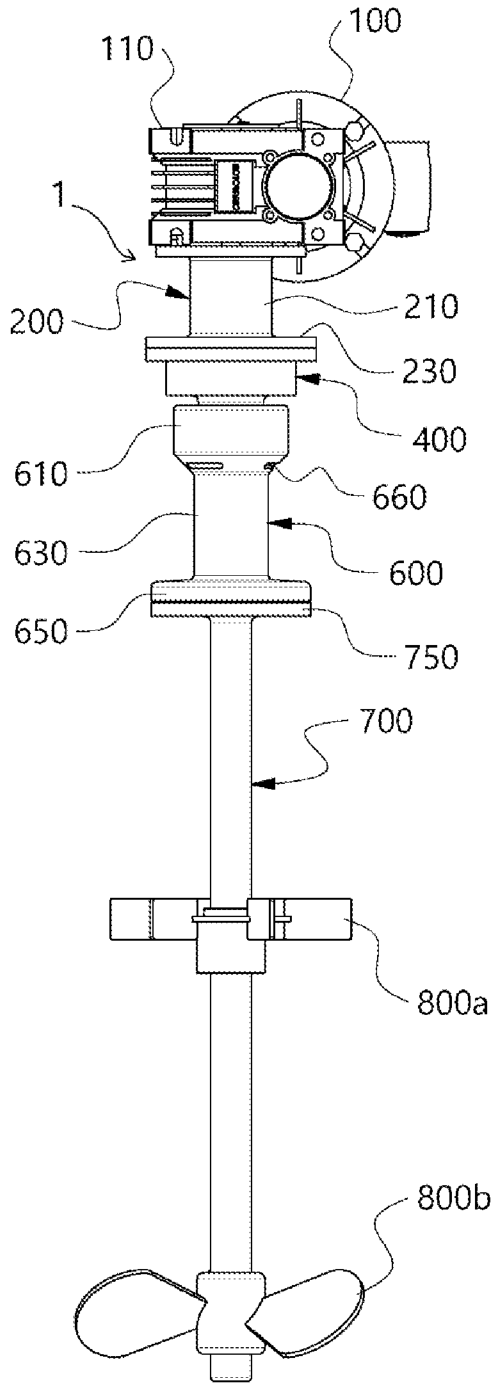
Figure 4:
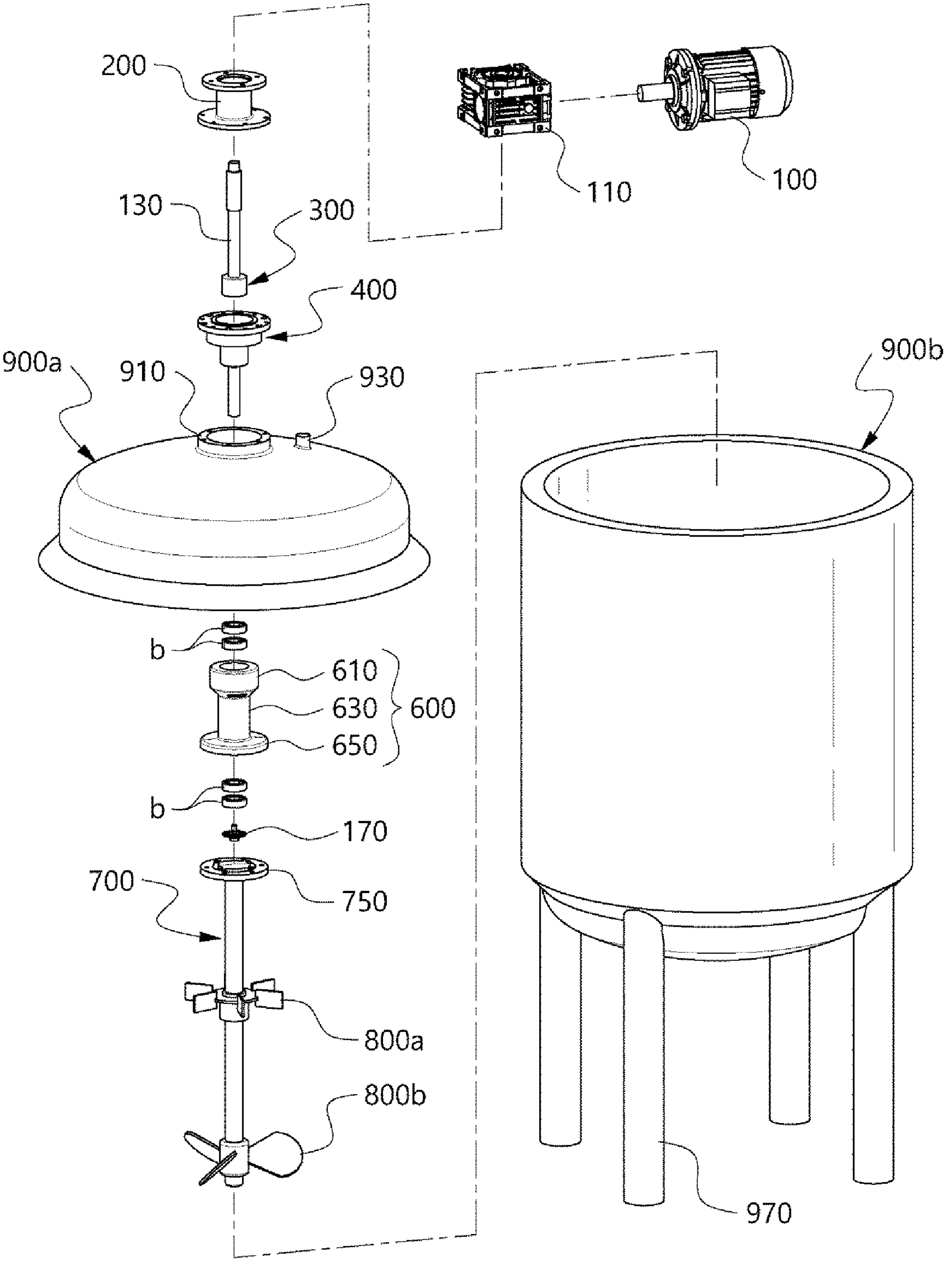
FIG. 4 is an exploded perspective view of a liquid mixing system according to the present invention.
Figure 5:
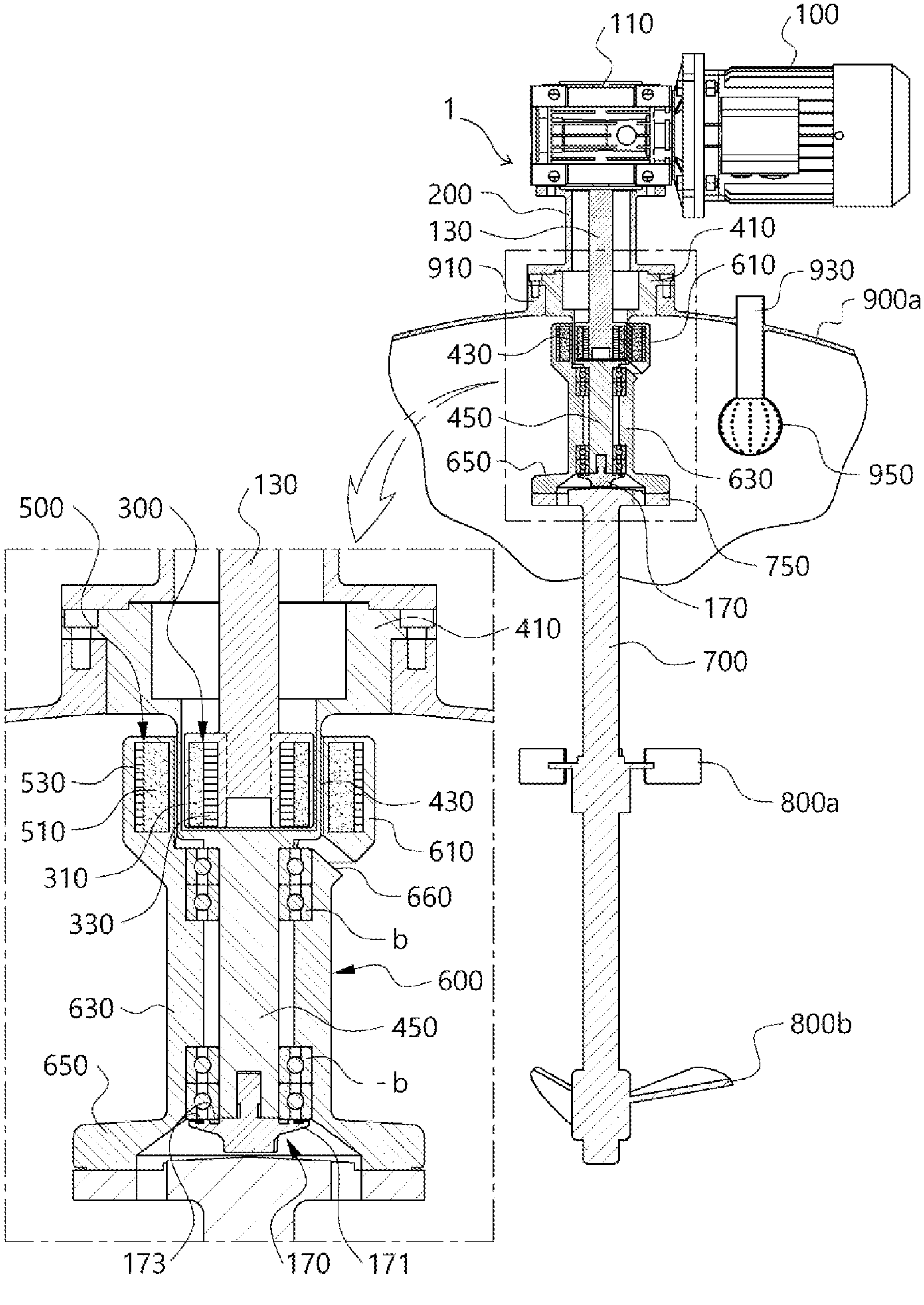
FIG. 5 is a cross-sectional view of the magnetic mixer of FIGS. 3A and 3B.

FIGS. 3A and 3B illustrate a perspective view and a side view of a magnetic mixer 1 mounted on the liquid mixing system 1000 of FIGS. 1 and 2, according to the invention. FIG. 4 is an exploded perspective view of the liquid mixing system 1000 according to the present invention. FIG. 5 is a cross-sectional view of the magnetic mixer 1 of FIGS. 3A and 3B.

As described above, the magnetic mixer 1 according to the present invention may have a structure in which an impeller shaft 700 with impellers 800*a* and 800*b* is placed in the mixing tank 900 through the mounting hole 910 in the upper surface of the mixing tank 900 and a reducer 110 and a driving motor 100 are provided on the mixing tank 900.

The magnetic mixer 1 according to the present invention may include: the driving motor 100 outside the mixing tank 900; a drive shaft 130 driven by the driving motor 100; a first magnetic unit 300 provided at an end of the drive shaft 130 and including a plurality of magnetic bodies; a top plate 400 including a tank mounting part 410 installed inside the mixing tank 900 through the mounting hole 910 of the mixing tank 900, a first magnetic unit receiving part 430 in which the first magnetic unit 300 is rotatably accommodated, and a support shaft 450 extending below the first magnetic unit receiving part 430; the driving member 600 mounted inside the mixing tank 900 to be rotatable about an outer side of the top plate 400 and a second magnetic unit 500 provided at the same height as the first magnetic unit 300; and the impeller shaft 700 connected to the bottom of the driving member 600 and including at least one impeller, e.g., the impellers 800*a* and 800*b*.

A motor shaft of the driving motor 100 may be disposed in a horizontal direction, and the driving motor 100 may be connected to the reducer 110 to perform torque amplification and deceleration.

The drive shaft 130 may be mounted downward perpendicularly to the reducer 110, and the first magnetic unit 300 may be mounted below the drive shaft 130.

The reducer 110 may be mounted on the mixing tank 900, and a housing 200 may be mounted on the mixing tank 900 to protect the drive shaft 130.

The housing 200 may be configured in a cylindrical pipe shape 210, and fastening flanges 230 may be provided to respectively mount the reducer 110 and the top plate 400 at the top and bottom of the housing 200.

The top plate 400 may be mounted under the housing 200. The top plate 400 may allow the first magnetic unit 300 mounted as a rotor on the drive shaft 130 to be disposed rotatably in the mixing tank 900, and support rotation of the driving member 600 having embedded therein the second magnetic unit 500 provided at a height corresponding to the first magnetic unit 300.

The top plate 400 may include the tank mounting part 410 mounted on the mixing tank 900 through the mounting hole 910 of the mixing tank 900, the first magnetic unit receiving part 430 accommodating the first magnetic unit 300 therein to be rotatable, and the support shaft 450 extending below the first magnetic unit receiving part 430. The tank mounting part 410, the first magnetic unit receiving part, and the support shaft 450 may have circular cross-sections, the outer diameters of which sequentially decrease to form a multi-stage shape.

In the top plate 400 below the housing 200, the tank mounting part 410 including an upper flange may be interposed between the housing 200 and the mounting hole 910 of the mixing tank 900 so that the housing 200, the top plate 400, and the mixing tank 900 may be fastened together.

The first magnetic unit receiving part 430 is configured to accommodate the first magnetic unit 300 mounted at the bottom of the drive shaft 130 connected to the reducer 110 so as to be rotatable during the rotation of the driving motor 100, and may be maintained not to be in contact with the inner circumferential surface of the first magnetic unit receiving part 430 of the top plate 400 and the outer circumferential surface of the first magnetic unit 300.

The support shaft 450 is provided below the first magnetic unit receiving part 430 to support the driving member 600, which will be described below, to be rotatable.

The driving member 600 may be mounted to be rotatable about the outer sides of the first magnetic unit receiving part 430 and the support shaft 450 of the top plate 400 inside the mixing tank 900. The driving member 600 is configured to rotate the impeller shaft 700 provided with the impellers 800*a* and 800*b* and included in the mixing tank 900, when the driving motor 100 is driven.

Thus, the second magnetic unit 500 magnetically coupled to the first magnetic unit 300 accommodated in the first magnetic unit receiving part 430 of the top plate 400 may be provided on the driving member 600.

Specifically, in the driving member 600, a second magnetic unit embedding part 610 having the second magnetic unit 500 embedded therein, a shaft through part 630 which is connected to the bottom of the second magnetic unit embedding part 610 and through which the support shaft 450 of the top plate 400 passes, and a shaft connection part 650 provided below the shaft through part 630 and connected to the impeller shaft 700 may be included in a downward direction.

The top plate 400 may be fastened to the mixing tank 900, and the support shaft 450 below the first magnetic unit receiving part 430 may serve as a shaft supporting the rotation of the driving member 600.

The driving member 600 may include the second magnetic unit embedding part 610 having the second magnetic unit 500 embedded therein, the shaft through part 630 which is connected to the bottom of the second magnetic unit embedding part 610 and through which the support shaft 450 of the top plate 400 passes, and the shaft connection part 650 provided below the shaft through part 630 and connected to the impeller shaft 700.

The driving member 600 may have an overall pipe shape, in which the second magnetic unit 500 may be embedded in an upper portion and the shaft connection part 650 of for fastening the impeller shaft 700 may be provided at a lower portion.

The top plate 400 is configured to be fixed to the mixing tank 900 and the driving member 600 is configured to be rotatable while being connected to the impeller shaft 700, and thus, at least one bearing b may be mounted between the top plate 400 and the driving member 600.

To this end, as illustrated in FIG. 5, a bearing mounting hole having an expanded inner diameter may be provided to mount the bearing b in the top and bottom of the shaft through part 630 of the driving member 600, and the shaft through part 630 of the driving member 600 and the support shaft 450 of the top plate 400 may be supported by the bearing b to be rotatable relative to each other.

Specifically, an inner ring of each bearing b may be mounted on the support shaft 450 of the top plate 400 and an outer ring thereby may be mounted on the shaft through part 630 of the driving member 600, i.e., an inner circumferential surface of the bearing mounting hole, thereby providing provide a structure allowing the rotation of the driving member 600.

FIG. 5 illustrates that the bearing mounting hole for mounting two bearings b on the top and bottom of the shaft through portion 630 of the driving member 600 is provided but the number of bearings b may be increased or decreased.

A bearing bolt 170 may be fastened to the support shaft 450 of the top plate 400 to prevent separation of the bearing b in a state in which the bearing b is mounted in the bearing mounting hole under the shaft through part 630.

The driving member 600 is rotatably mounted on the support shaft 450 of the top plate 400 through the bearing b but the bearing bolt 170 supports the driving member 600 downward because there is no separate lower support structure.

That is, the bearing bolt 170 may include flanges 171 for supporting the bearing b.

As shown in the enlarged view of FIG. 5, the flanges 171 are regions extending widely from a head of the bearing bolt 170 and may provide a structure supporting the driving member 600 downward by supporting a bottom surface of the bearing b mounted in the bearing mounting hole below the shaft through part 630 of the driving member 600.

The flanges 171 of the bearing bolt 170 may provide a function of preventing foreign substances from falling into the mixing tank 900 due to friction or abrasion of the bearing b or the like, as well as providing the structure supporting the bearing b or the driving member 600 downward.

That is, inner circumferential surfaces of the flanges 171 may provide a function of collecting foreign substances while supporting the bottom surface of the bearing b horizontally. Collecting grooves 173 or the like for collecting foreign substances may be formed on the inner circumferential surfaces of the flanges 171 to reinforce the function of collecting foreign substances.

The shaft connection part 650 may be provided in the form of a flange under the shaft through part 630 of the driving member 600. The shaft connection part 650 of the driving member 600 and an upper end 750 of the impeller shaft 700 may be configured in the form of a flange and fastened together by a fastening member to cause the impeller shaft 700 to be rotated during the rotation of the driving member 600.

When a mixing process is completed, the inside of the mixing tank 900 needs to be cleaned. Accordingly, washing water may be sprayed from the spray ball 950 to clean the inner circumferential surface of the stirring tank 900 and the inside of the driving member 600.

To this end, at least one of the second magnetic unit embedding part 610, the shaft through part 630, and the shaft connection part 650 of the driving member 600 may include a washing water inlet 660 into which the washing water sprayed from the spray ball 950 may flow.

As illustrated in FIG. 2, because washing water may be sprayed from the spray ball 950 in all directions, the sprayed washing water may flow through a gap between the second magnetic unit embedding part 610 of the driving member 600 and the first magnetic unit receiving part 430 of the top plate 400 or through washing water inlets 660 of the second magnetic unit embedding part 610 and the shaft through part 630 of the driving member 600, thereby cleaning foreign substances on the bearing between the shaft through part 630 of the driving member 600 and a shaft support of the top plate 400, and the like.

A washing water outlet may be provided in a flange of an upper portion of the impeller shaft 700 to easily discharge the washing water after the bearing b between the shaft through part 630 of the driving member 600 and the shaft support of the top plate 400 and the like are cleaned.

At least one impeller may be provided at intervals on the impeller shaft 700. Furthermore, a plurality of impellers may be provided at intervals on the impeller shaft 700 according to a capacity of the mixing tank 900 or the like. The shape or type of the plurality of impellers may vary according to the type of a target liquid or particulate material contained in the mixing tank 900 or the height of the impeller shaft.

When a plurality of impellers are spaced apart from each other, an entire target liquid contained in the mixing tank 900 may be mixed.

The magnetic mixer 1 of the above structure may be mounted in the mixing tank 900 divided into a cover **900*a* and a main body 900*b* as illustrated in FIG. 4. The housing 200 and the top plate 400 may be mounted on the cover 900*a* of the mixing tank 900, the drive shaft 130 equipped with the first magnetic unit 300 may be mounted downward from the top of the top plate 400. The drive shaft 130 may be mounted on the reducer 110 and the driving motor 100 may be mounted in a lateral direction of the reducer 110**.

When the support shaft 450 of the top plate 400 exposed under the cover **900*a* of the mixing tank 900 is disposed downward, the driving member 600, the bearing b, and the like may be mounted and the bearing bolt 170 may be fastened to the support shaft 450 of the top plate 400, so that the bearing b between the shaft through part 630 of the driving member 600 and the support shaft 450 of the top plate 500 may be supported by the bearing bolt 170 to support the driving member 600** downward.

In addition, the impeller shaft 700 may be fastened to a shaft connection part at a lower end of the driving member 600, thereby completing the assembly of the magnetic mixer 1.

In the magnetic mixer 1, during the rotation of the driving motor 100 a driving force may be transmitted to the drive shaft 130 and the first magnetic unit 300 through the reducer 110, and the second magnetic unit 500 embedded in the second magnetic unit embedding part 610 of the driving member 600 may be driven to be magnetically coupled to the first magnetic unit 300, thereby rotating the driving member 600 and the impeller shaft 700 fastened to the driving member 600.

In the mixing system 1000 which is a large-scale system including the impeller shaft 700, the impeller shaft 700 is long disposed inside the mixing tank 900 and a plurality of impellers are provided at intervals to uniformly mix liquids to be mixed but a driving force is transmitted by magnetic coupling and thus an output of a mixer is limited.

Figure 6:
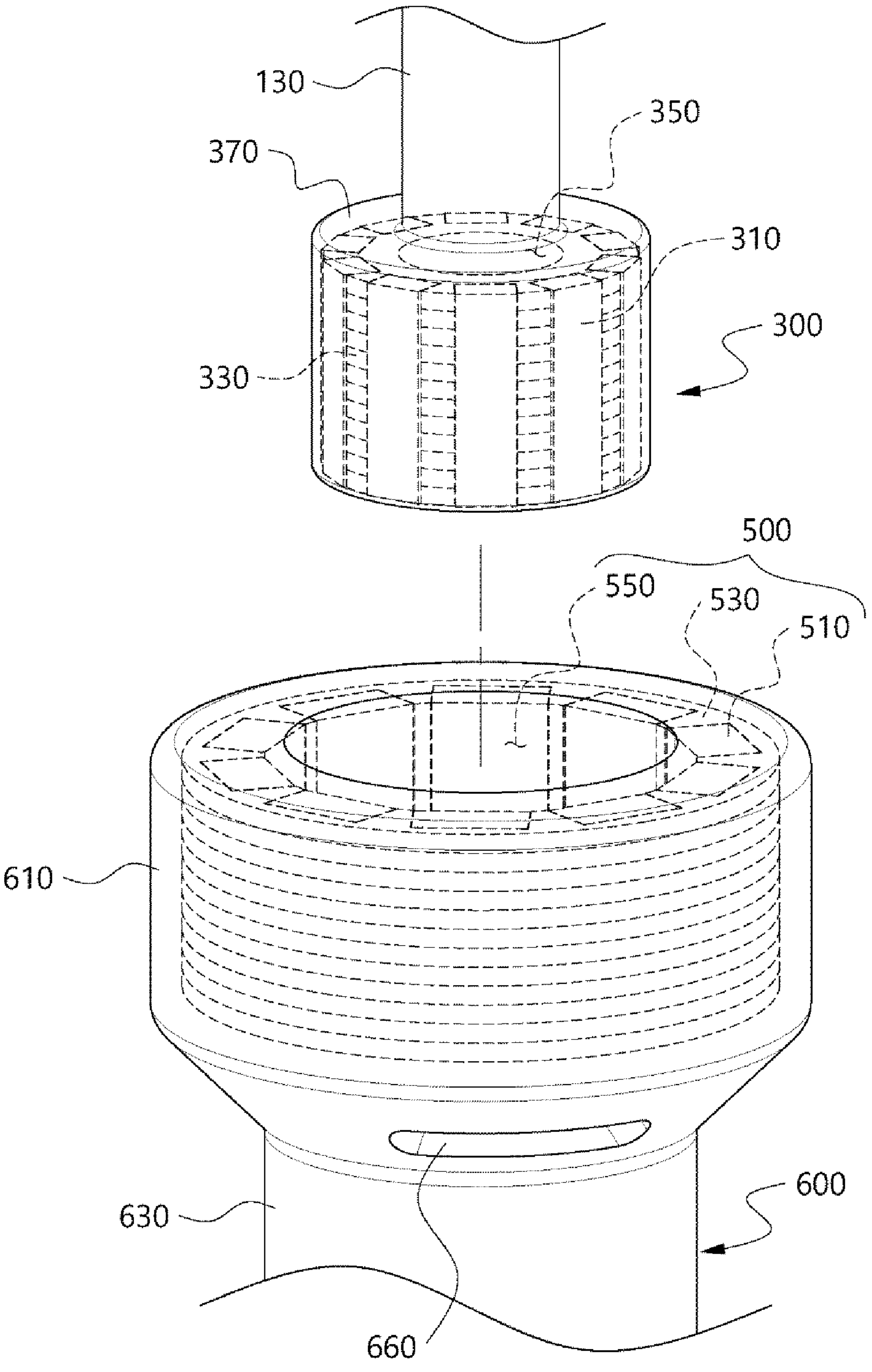
FIG. 6 illustrates a coupling relationship between a first magnetic unit and a second magnetic unit of a magnetic mixer according to the present invention.

FIG. 6 illustrates a coupling relationship between the first magnetic unit 300 and the second magnetic unit 500 of the magnetic mixer 1 according to the present invention. FIGS. 7A to 7D illustrate cores of the first magnetic unit 300 and the second magnetic unit 500 of the magnetic mixer 1 according to the present invention.

The first magnetic unit 300 illustrated in FIG. 6 may be mounted at the bottom of the drive shaft 130, and the second magnetic unit 500 may be embedded in the second magnetic unit embedding part 610 on the driving member 600.

The first magnetic unit 300 may include a pipe-shaped body 330 having at a center a shaft hole 350 in which the drive shaft 130 is mounted, a plurality of permanent magnets 310 embedded in an outer circumferential surface of the pipe-shaped body 330 such that the permanent magnets 310 with different polarities are arranged alternately at certain intervals, and a metal protective layer 370 (see FIG. 6) configured to surround outer sides of the pipe-shaped body 330 and the plurality of permanent magnets 310.

Although not shown in FIG. 6, the first magnetic unit 300 may be configured to be rotatable together with the rotation of the drive shaft 130 while being accommodated in the first magnetic unit receiving part 430 of the top plate 400.

The metal protective layer 370 may form an outer circumferential surface of the first magnetic unit 300 and be finished integrally with the first magnetic unit 300 to a boundary of the drive shaft 130 so that the permanent magnets 310 may not be exposed to the outside. The metal protective layer may be formed, for example, of a thin metal tube or by coating a metal.

The metal protective layer 370 may be formed to a sufficiently thin thickness to prevent attenuation of magnetic forces of the permanent magnets 310 of the first magnetic unit 300.

Similarly, the second magnetic unit 500 includes a pipe-shaped body 530 with an opening 550 in which the first magnetic unit receiving part 430 of the top plate 400 is rotatably disposed, and a plurality of permanent magnets 510 embedded in an inner circumferential surface of the pipe-shaped body 530 such that the permanent magnets 510 with different polarities are alternately arranged at intervals. The second magnetic unit 500 is embedded in the second magnetic unit embedding part 610 of the driving member 600 and thus the second magnetic unit embedding part 610 of the driving member 600 may serve as a metal protective layer.

When the permanent magnets 310 of the first magnetic unit 300 are rotated, the permanent magnets 510 of the second magnetic unit 500 are magnetically coupled to the permanent magnets 310 according to the polarities of the permanent magnets 310 and rotated together with the permanent magnets 310, thereby mixing target liquids contained in the mixing tank 900.

According to the present invention, a structure for allowing use of the magnetic forces of the permanent magnets 310 and 510 of the first and second magnetic units 300 and 500 as much as possible for magnetic coupling between the first and second magnetic units 300 and 500 is applied to solve an output problem of the magnetic mixer 1.

As illustrated in FIGS. 7A to 7D, magnetic coupling directions of the first magnetic unit 300 and the second magnetic unit 500 are different, i.e., an outer circumferential direction and an inner circumferential direction.

That is, magnetic forces of the permanent magnets 310 of the first magnetic unit 300 should be transmitted in the outer circumferential direction and magnetic forces of the permanent magnets 510 of the second magnetic unit 500 should be transmitted in the inner circumferential direction, so that the permanent magnets 310 and 510 of the first magnetic unit 300 and the second magnetic unit 500 may be coupled to each other by the magnetic forces thereof to transmit driving torque.

Accordingly, the first magnetic unit 300 may be mounted such that the plurality of permanent magnets 310 with different polarities are alternately arranged on the outer circumferential surface of the pipe-shaped body 330, and the second magnetic unit 500 may be mounted such that the plurality of permanent magnets 510 with different polarities are alternately arranged on the inner circumferential surface of the pipe-shaped body 530.

As illustrated in FIGS. 7A to 7D, an integral body with a long groove for mounting therein permanent magnets may be considered so that the permanent magnets 310 and 510 of the first and second magnetic units 300 and 500 may be mounted and exposed at intervals on an outer or inner circumferential surface of the body, but a method such as elaborate machining or casting should be applied and thus a manufacturing process is difficult and expensive.

Accordingly, in the present invention, the pipe-shaped bodies 330 and 530 of the first and second magnetic units 300 and 500 may be configured by stacking ring-shaped plates 331 and 531 each including a plurality of grooves in an outer circumferential surface or an inner circumferential surface in a circumferential direction, so that the permanent magnets 310 and 510 may be mounted to be spaced apart from each other. The ring-shaped plates 331 and 531 each including the plurality of grooves may be easily configured by a method such as punching, thereby reducing manufacturing costs of the bodies 330 and 530.

After stacking the ring-shaped plates 331 and 531 each including the plurality of grooves, permanent magnets may be mounted thereon to fasten the ring-shaped plates 331 and 531 using magnetic forces without performing welding and causing gaps or grooves.

It may be assumed that magnitudes of magnetic forces or magnetic fields emitted from the permanent magnets 310 or 510 of the first or second magnetic units 300 or 500 of the magnetic mixer 1 are constant. Therefore, magnetic forces or magnetic fields of the first magnetic unit 300 may be blocked in the inner circumferential direction and magnetic forces or magnetic fields of the second magnetic unit 500 may be blocked in the outer circumferential directions in consideration of magnetic coupling directions of the respective first and second magnetic units 300 and 500, thereby maximizing strength of magnetic coupling.

Although magnetic forces or magnetic fields may be naturally blocked when a thickness of a body or ring-shaped plates constituting the body excluding grooves is increased in a radial direction, an increase in the weight of a magnetic unit increases load on the driving motor 100 and thus increasing the thickness of the body or the ring-shaped plates is not desirable.

Figure 7A:
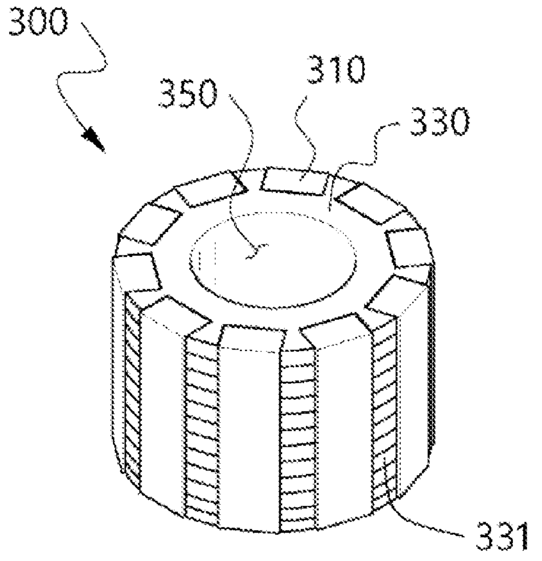
FIGS. 7A to 7D illustrate cores of a first magnetic unit and a second magnetic unit of a magnetic mixer according to the present invention.
Figure 7B:
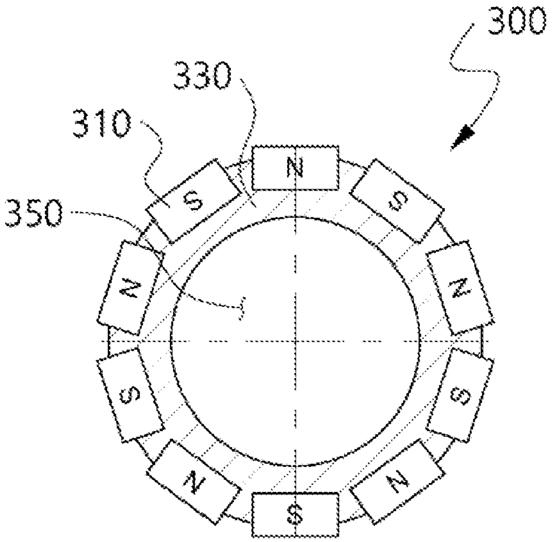

Accordingly, as illustrated in FIGS. 7A and 7B, the first magnetic unit 300 may be mounted in a semi-embedded state such that the permanent magnets 310 are exposed in the outer circumferential direction of the body 330, and thus, magnetic forces or magnetic fields may be completely transmitted in a magnetic coupling direction and may be blocked in an opposite direction (the inner circumferential direction) due to the thickness of the body 330.

Figure 7C:
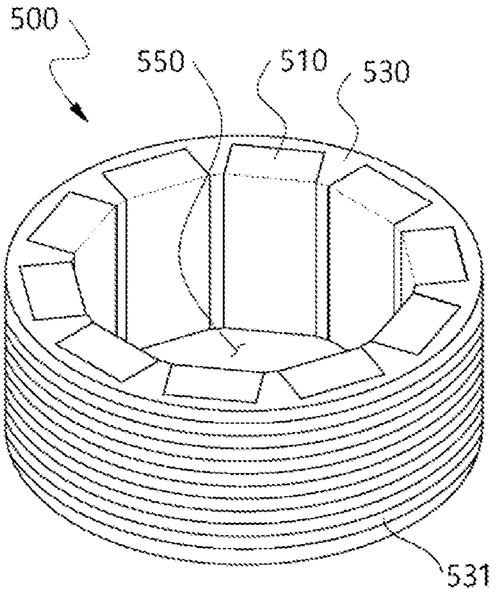
Figure 7D:
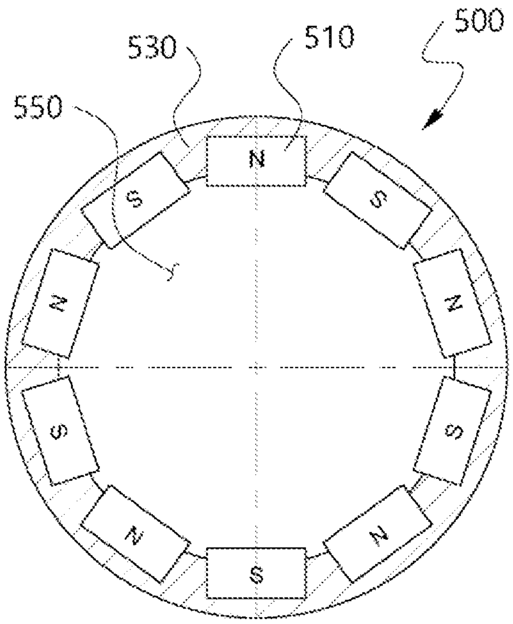

For the same reason, as illustrated in FIGS. 7C and 7D, the second magnetic unit 300 may be mounted in a semi-embedded state such that the permanent magnets 510 are exposed in the inner circumferential direction of the body 530, and thus, magnetic forces or magnetic fields may be completely transmitted in the inner circumferential direction and may be blocked in an opposite direction (the outer circumferential direction) due to the thickness of the body 530.

Furthermore, it was found that when each of the body 330 of the first magnetic unit 300 and the body 530 of the second magnetic unit 500 was formed of a high permeability metal having a magnetic shielding function, e.g., an alloy material containing by weight 70% or more of nickel, it was meaningful for magnetic field shielding and magnetic field concentration.

For example, a material such as supermalloy having super-high permeability or mu-metal (an alloy containing 75% nickel, 20% iron, and 5% copper) may be applied as an example of a high permeability metal used to form the bodies 310 and 510 of the first and second magnetic units 300 and 500 or the ring-shaped plates 331 and 551 constituting the bodies 310 and 510, but embodiments are not limited thereto.

Supermalloy is a type of Mo—Ni—Fe alloy and refers to a metal obtained by heating a non-metal-free material, which is obtained when 5% molybdenum permalloy (5% molybdenum, 79% nickel, and remaining iron) is dissolved in a vacuum without being forcibly deoxidized and is cast in helium or nitrogen gas not to be oxidized, to a high temperature and purifying the non-metal-free material in a hydrogen gas atmosphere and heat-treating a resultant material under optimal heat treatment conditions.

At least three surfaces of each permanent magnet was shielded by a body of a magnetic unit formed of such a material as shown in FIGS. 7A to 7D and thus a magnetic force or magnetic field of each permanent magnet was focused in a magnetic coupling direction, thereby minimizing load on the driving motor 100 and improving a mixing output by at least 20% or more by the driving motor 100.

In addition, it was found that a mixing output was improved by at least 30% by the driving motor 100 when grooves of the body in which permanent magnets are to be mounted was configured to shield upper and lower surfaces of the permanent magnets.

In the magnetic mixer 1 having the above configuration and the mixing system 1000 including the same, although the drive shaft 130 extends into the mixing tank 900, a driving force can be transmitted between axes by magnetic coupling and thus a magnetic seal for sealing the drive shaft 130 may be omitted, thereby minimizing contamination of fluids to be mixed due to the magnetic seal and the like. The spray ball 950 is disposed near the driving member 600 and a cleaning path is provided inside the driving member 600 to clean the support shaft 450, and thus, the inside of the mixing tank 900 and the inside of the driving member 600 can be cleaned using washing water sprayed from the spray ball 950 and a pipe structure for cleaning can be minimized, thereby simplifying the system.

In addition, a body of each magnetic unit may be formed of a metal with high permeability to maximize output transfer efficiency of the driving motor 100, and ring-shaped plates may be stacked to form a magnetic unit, thereby minimizing manufacturing costs.

According to a magnetic mixer according to the present invention, although a driving motor is provided outside a mixing tank and a drive shaft extends to the mixing tank, a driving force can be transmitted between shafts by magnetic coupling and thus a mechanical seal for sealing a drive shaft and the like may be omitted, thereby minimizing contamination of fluids to be mixed due to the mechanical seal and the like.

In addition, according to the magnetic mixer according to the present invention, a cleaning path is provided between a driving member rotatably driven by driving torque transmitted by magnetic coupling and a support shaft and thus cleaning may be performed with washing water sprayed from a spray ball inside the mixing tank, thereby simplifying a pipe structure for cleaning.

While the present invention has been described above with respect to exemplary embodiments thereof, it would be understood by those of ordinary skilled in the art that various changes and modifications may be made without departing from the technical conception and scope of the present invention defined in the following claims. Thus, it is clear that all modifications are included in the technical scope of the present invention as long as they include the components as claimed in the claims of the present invention.

What is claimed is:

1. A mixing system comprising:

a mixing tank containing liquids or particulate materials to be mixed; and a magnetic mixer mounted on the mixing tank, wherein the magnetic mixer comprises:

a driving motor mounted outside the mixing tank;

a drive shaft driven by the driving motor;

a first magnetic unit provided at an end of the drive shaft and including a plurality of magnetic bodies;

a top plate including a tank mounting part mounted in the mixing tank through a mounting hole of the mixing tank, a first magnetic unit receiving part configured to allow the first magnetic unit to be rotatably accommodated therein; and a support shaft extending below the first magnetic unit receiving part;

a driving member mounted inside the mixing tank to be rotatable relative to the top plate, the driving member including a second magnetic unit provided at the same height as the first magnetic unit; and an impeller shaft connected to a bottom of the driving member, and including at least one impeller, wherein the driving member comprises:

a second magnetic unit embedding part in which the second magnetic unit is embedded;

a shaft through part which is connected to a bottom of the second magnetic unit embedding part and through which the support shaft of the top plate passes; and an impeller shaft connection part which is provided below the shaft through part and to which the impeller shaft is connected, wherein the shaft through part has a single hollow cylindrical shape and an entire portion of the support shaft is covered by the shaft through part, wherein an outer diameter of the impeller shaft connection part is greater than an outer diameter of the shaft through part, wherein the driving member comprises a washing water inlet formed on an outer side surface of the driving member, the washing water inlet forming a cleaning path between the support shaft and the shaft through part for cleaning the support shaft, wherein the washing water inlet is formed on a tapered portion provided between the second magnetic unit embedding part and the shaft through part, wherein the driving member further comprises an upper bearing provided at an upper end of the support shaft, and the washing water inlet is provided above the upper bearing, wherein the driving member further comprises a bearing bolt on which a lower bearing is mounted, and the bearing bolt is provided with a flange for supporting the lower bearing, wherein the flange is formed with a foreign substance collection groove which blocks a foreign substance falling from the cleaning path formed by the washing water inlet, wherein the mixing tank comprises a spray ball with a plurality of injection holes for spraying washing water into the mixing tank, wherein the injection holes of the spray ball are provided in all directions, wherein the spray ball is placed lower than the washing water inlet.

2. The mixing system of claim 1, wherein the impeller shaft connection part of the driving member and an upper end of the impeller shaft are provided in the form of a flange and fastened together by a fastening member.

3. The mixing system of claim 1, wherein a plurality of impellers are provided at intervals on the impeller shaft.

4. The mixing system of claim 1, further comprising a reducer configured to connect the driving motor and the drive shaft, wherein a motor shaft of the driving motor is connected to the reducer in a horizontal direction.

5. The mixing system of claim 1, wherein the mixing tank further comprises:

a mounting hole configured to mount therein the tank mounting part of the top plate of the magnetic mixer; and a pipe connection hole to which a washing water pipe for supply of washing water is to be connected.

6. The mixing system of claim 1, wherein bearing mounting holes each having an expanded inner diameter are provided at a top and bottom of the shaft through part of the driving member to mount the upper and lower bearings, wherein the shaft through part of the driving member is supported by the upper and lower bearings mounted in the bearing mounting holes such that the shaft through part is rotatable relative to the support shaft.

7. The mixing system of claim 6, wherein, the bearing bolt prevents separation of the lower bearing in a state in which the lower bearing is mounted in the bearing mounting hole in the bottom of the shaft through part, and the bearing bolt is fastened to the support shaft of the top plate.

8. The mixing system of claim 1, wherein the first magnetic unit or the second magnetic unit comprises:

a pipe-shaped body having at a center a shaft hole in which the drive shaft is mounted or an opening in which the first magnetic unit receiving part of the top plate is disposed; and a plurality of permanent magnets with different polarities arranged alternately at certain intervals on an outer circumferential surface or inner circumferential surface of the pipe-shaped body.

9. The mixing system of claim 8, wherein the pipe-shaped body is formed of a supermalloy or a mu-metal material.

10. The mixing system of claim 8, wherein the pipe-shaped body is formed of an alloy material containing by weight 70% or more of nickel.

11. The mixing system of claim 8, wherein the plurality of permanent magnets of the first or second magnetic unit are spaced apart from each other, and at least some of the plurality of permanent magnets are embedded in the pipe-shaped body.

12. The mixing system of claim 11, wherein the pipe-shaped body is configured by stacking ring-shaped plates each including a plurality of grooves.

* * * * *